Figure 1:
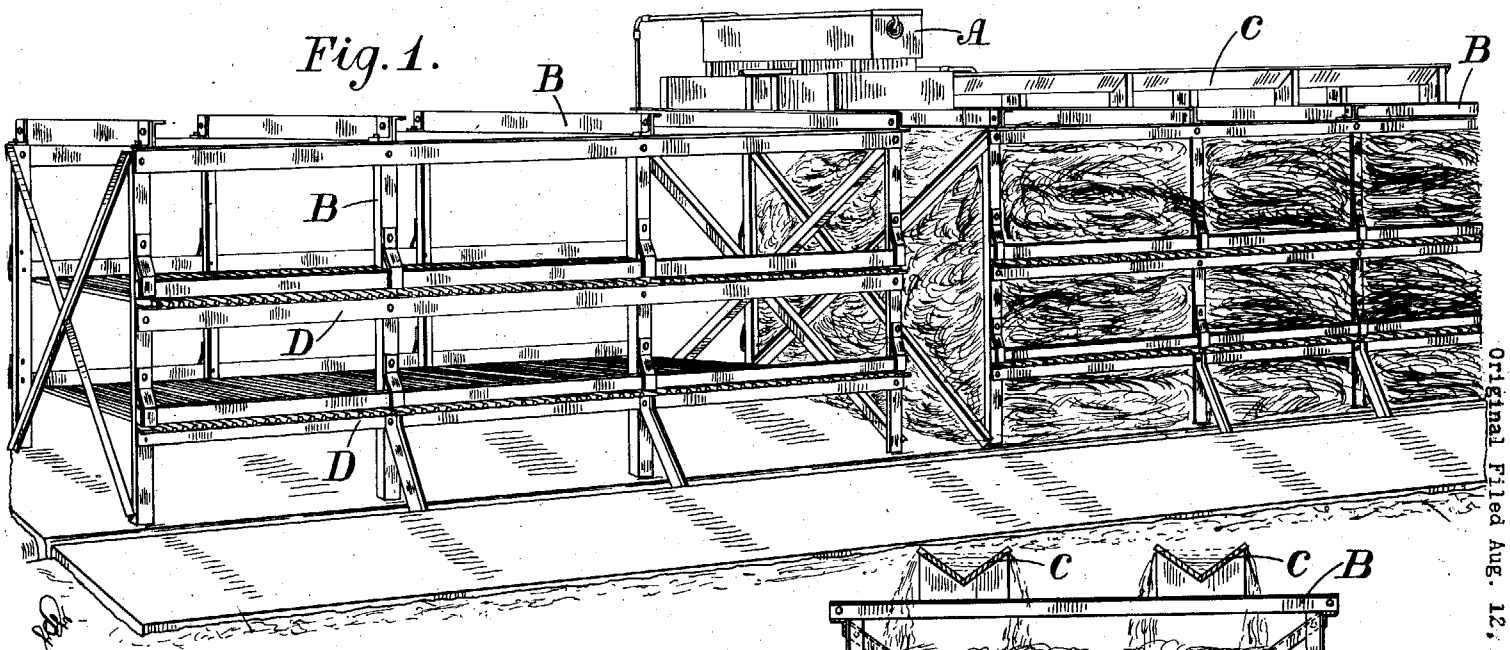
Figure 2:
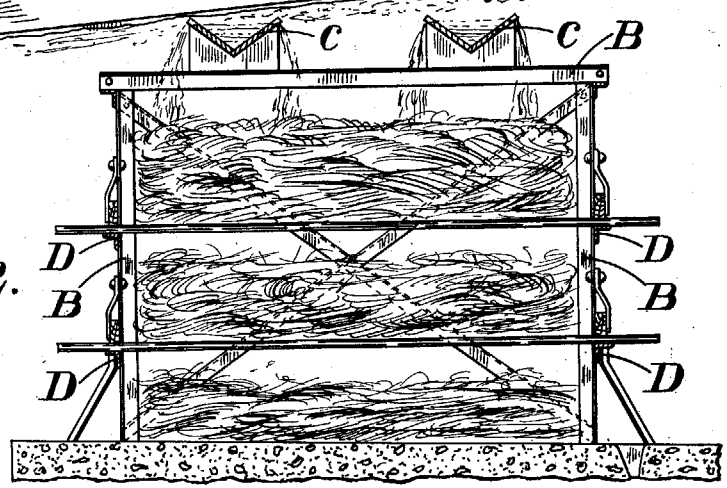

E. H. RICHARDS ET AL

MANUFACTURE OF NITROGENOUS FERTILIZERS AND THE UTILIZATION OF NITROGEN BEARING SOLUTIONS

Aug. 30, 1932. Re. 18,587

Original Filed Aug. 12, 1921

Inventors

Eric Kansford Richards,
Henry Bingham Hutchinson,
by Byrnes, Stebbins, Burgess & Parmelee
their atty.

Reissued Aug. 30, 1932 Re. 18,587

UNITED STATES PATENT OFFICE

ERIC HANNAFORD RICHARDS, OF HARPENDEN, AND HENRY BROUGHAM HUTCHINSON, OF EPSOM, ENGLAND, ASSIGNORS TO ADCO LIMITED, OF HARPENDEN, ENGLAND, A BRITISH COMPANY

MANUFACTURE OF NITROGENOUS FERTILIZERS AND THE UTILIZATION OF NITROGEN-BEARING SOLUTIONS

Original No. 1,471,979, dated October 23, 1923, Serial No. 491,774, filed August 12, 1921. Application for reissue filed February 10, 1931. Serial No. 514,879.

This invention is for improvements in and relating to the production of nitrogenous fertilizers and the utilization of solutions of soluble nitrogen.

The invention aims at providing a simple process for the production of nitrogenous fertilizers from solutions of nitrogenous compounds. Such solutions may be artificially prepared for the purpose, or suitable nitrogenous waste liquids from industrial and other sources may be employed. Various attempts have been made to utilize these attenuated solutions, but no satisfactory method has hitherto been devised for the economical recovery of their nitrogen. This invention, therefore, also serves to afford means for turning such waste liquids to profitable account.

The present invention is based upon studies which demonstrate that under appropriate conditions definite reactions may be brought about between suitable carbohydrate-containing materials and nitrogenous solutions, whereby practically the whole of the nitrogen may be removed from the solution and recovered in organic combination. The nitrogenous products so obtained are insoluble in water, but in presence of soil the nitrogen becomes available and easily assimilable by plants.

Our investigations demonstrate that if soluble nitrogenous compounds be brought into contact with a substance containing fermentable carbohydrate-containing compounds, such, for instance, as straw, and fermentation be allowed to proceed under suitable conditions, the soluble nitrogenous compound is transformed into insoluble derivatives which, however, are retained by the carbonaceous material, now partially fermented. Different kinds of the said fermentable substances are distinguished one from another in respect to their capacity to form and retain the insoluble nitrogen compounds. This property of retention may be described as "loading" with the insoluble derivatives in question, and the retentive capacity of each kind of material is strictly limited. For example, in the case of wheat straw, 1000 parts of this material will render insoluble and will retain from 7 to 10 parts of soluble nitrogen, equivalent to 35 to 50 parts of the soluble nitrogen compound such, for instance, as ammonium sulphate. As stated above, since under appropriate conditions practically the whole of the nitrogen may be removed from the solution and recovered in organic combination by treatment of 1000 parts of wheat straw with about 7 to 10 parts of soluble nitrogen, a fertilizer whose nitrogen is available to and readily assimilable by plants is produced with a maximum of economy.

A characteristic feature of the process of this invention resides in the utilization, as food for a group of organisms which require nitrogen for the elaboration of their own bodies, of the more easily digestible portions of vegetable matter such as straw, dead leaves, bracken, or other suitable carbonaceous material, hereinafter designated "carbohydrate-containing material", since starch, sugar or cellulose is a necessary food for the development of the organisms in question. These organisms are highly aerobic and, under proper aerobic conditions, in presence of nitrogeneous solutions, such as, for example, solutions of ammoniacal nitrogen, they take nitrogen from the solution and carbon from the more digestible constituents of the carbohydrate-containing matter and effect the combination of these elements with production of insoluble derivatives in their own cell-structure or excretions. These organisms are normally present in soil, and are therefore normally found in substances such as straw, and an organic nutrient inoculated with these organisms may be conveniently designated as fermentable carbohydrate-containing material. Before such material can function satisfactorily in forming insoluble nitrogen compounds, however, a certain condition of development of the organisms must be brought about, that is to say, a plentiful growth of these organisms must have occurred. Fermentable material in which this condition has been established is hereafter referred to as "activated" in this specification and claims. The action of these organisms has definite limits, as stated above, and, given appropriately activated material, the other essential factors for successful nitrogen recovery are a suitable period of contact between the said material and the nitrogenous solution, and the maintenance during contact of a proper reaction and effective aerobic conditions.

The terms "soluble" and "insoluble" are employed in this specification and claims as denoting respectively solubility and insolubility in water.

According to the present invention, a process for the production of a nitrogenous fertilizer and the utilization of solutions of soluble nitrogenous compounds comprises treating a fermentable carbohydrate containing material with a nitrogen-bearing solution under aerobic conditions.

The activated material may be obtained by maintaining a fermentable carbohydrate-containing substance in contact under aerobic conditions with a solution of a nitrogenous compound until the organisms are actively developed.

Obviously, if the organic material available be sterile in respect to these nitrogen-fixing organisms, it may be inoculated with them and activated by aerobic contact with a nitrogenous solution which has already been treated with activated carbohydrate-containing matter.

Advantageously, the carbohydrate-containing material is maintained in contact with the solution until it is fully loaded with insoluble nitrogen derivatives formed from the soluble nitrogen and/or until the greater proportion of soluble nitrogen in the solution has been transformed into the insoluble state.

Any suitable nitrogenous product may be used to furnish the source of soluble nitrogen. For example, there may be employed a solution of cyanamide or of an ammonium salt, for instance, ammonium carbonate, or ammonium sulphate, or the residual liquors from ammonia recovery plants from which liquors ammonium sulphate has already been recovered, may be used. Alternatively, the soluble nitrogenous compound may be derived from sewage, or the easily available organic nitrogen in abattoir refuse, and the present invention therefore provides a means of recovering the nitrogen from this source in a convenient available form. The nitrates and nitrites of the alkali metals have not been found suitable for the purposes of our invention, and the term "soluble nitrogen" as used in this specification and in the claims is to be understood as not including these salts.

Nitrogen bearing solutions so treated, even if they be derived from waste liquids such as sewage of normal strength, are not putrescible on incubation, and are, therefore, unobjectionable except perhaps in respect to their more or less brown colour due to the presence of soluble products removed from the carbonaceous material employed.

For economical utilization of its nitrogen, the solution to be treated must be sufficiently dilute, and it is, therefore, preferred to operate with dilute solutions. The word "dilute" as applied to nitrogen-bearing solutions in this specification and claims denotes solutions the concentration of which does not attain a degree inimical to the proper action of the operative organisms. Moreover, working with too concentrated solutions results in waste of a substantial quantity of nitrogen, which is lost instead of passing into organic combination.

If the fermentation becomes too acid, the proper biological action is completely inhibited; the reaction should therefore be neutral or slightly alkaline. In certain cases, it may be advisable to add a certain proportion of a neutralizing agent, for example, calcium carbonate, either alone or in conjunction with a soluble phosphate, to the nitrogenous solution.

In carrying the invention into effect in one way, a solution of ammonium carbonate of a concentration equivalent to 10 parts of soluble nitrogen per 100,000 parts of solution is exposed to contact with activated straw by causing the solution to percolate through the straw, with free access of air, at the rate of about 250 gallons per cubic yard of straw per 24 hours, this representing the optimum rate of delivery for a solution of this concentration and for properly activated straw. The straw, if not already activated, may be brought into this condition for this process by maintaining it in contact, with free access of air, with the solution of ammonium carbonate, for a sufficient period of time, for example, for not less than 90 hours. That an appropriate time of contact is one of the conditions for economical utilization of the dissolved nitrogen, in order that the carbohydrate-containing material shall be fully loaded, has already been pointed out, and when methods such as percolation are employed the simplest means of fulfilling this condition is by regulation of the rate of flow of the nitrogenous solution.

As regards the solution, the process is preferably carried to that point at which the contacting liquid does not contain more than about 10 per cent. of the nitrogen originally present in it, resulting in the transformation of practically the whole of the nitrogen into the insoluble state. In order that the process may be worked continuously, provision should be made to renew the straw or other carbohydrate-containing material employed so soon as it has become fully "loaded", that is to say, as soon as the limit of its capacity to retain nitrogen has been reached, which occurs when the solution has reached the 10% figure given above.

The accompanying drawing illustrates one form of simple plant for carrying out the process of percolation continuously. A is a tank containing the nitrogenous solution, which is distributed over the straw in the framework B through a row of troughs C. When the lowest layer of straw is fully saturated with insoluble nitrogen, this layer is removed and the second layer is allowed to drop by withdrawing the supporting members D. The first layer is similarly transferred and is replaced at the top by fresh activated straw. As the end of any cycle, the lowest layer of straw is the substantially fully loaded material, the second and first layers are those of straw in an earlier and still earlier stage of treatment respectively.

It will usually be found that when percolation is adopted, the rate of delivery of the solution is, other things being equal, determined by the concentration, and as a general guide it may be said that the limit of concentration for this mode of operation is represented by 100 parts of soluble nitrogen per 100,000 parts of solution. Solutions of lower concentration than this are, however, to be preferred as a rule for economical reasons. Throughout the period of treatment aerobic conditions and a neutral or slightly alkaline reaction must be maintained.

The solution in contact with the straw may also be treated with air under pressure, or the straw and solution may be agitated together by mechanical means.

The material containing the insoluble nitrogen compounds is directly available as manure It may, however, be stored, under cover if desired, for a suitable length of time, say, three months, during which period it suffers loss in dry matter, up to, for instance, 40 per cent. of the original weight of the untreated carbohydrate-containing material, the nitrogen content consequently rising say from ½ per cent. in the original untreated carbohydrate-containing material to 2 to 2½ per cent. The physical condition of the final product resembles that of well-rotted stable manure.

The following is an example of a convenient mode of procedure for the production of a fertilizer when the plant method is not desired and where the successive processes of activation, loading, and rotting are combined in one operation:

1 ton of dry straw is built up into a heap, and as the heap is made up there is mixed in 1 cwt. of ammonium sulphate and 1 cwt. of fine chalk or limestone. Water is then added cautiously so that none runs away until about 4 tons have been absorbed by the straw. Alternatively, the straw and the chalk may be wetted first and the ammonium sulphate applied subsequently. The mass is then left for three months. Advantageously, the heap is turned over a month from the start. The figures given represent a nitrogen concentration in the solution of 0.25 per cent. at the start. This corresponds to 10 parts of nitrogen per 1000 quarts of dry straw. Of this nitrogen, a small proportion is lost in the three months, the remainder being transformed into organic combination. Since the straw has a retentive capacity of 7 to 10 parts of soluble nitrogen per 1000 parts of straw, as previously explained, a substantially loaded product is obtained. An initial nitrogen concentration of 0.5 per cent. gives an equally good manure, but as this corresponds to 20 parts of soluble nitrogen per 1000 parts of straw or twice as much nitrogen as can be retained, a high percentage of nitrogen is lost. This is an illustration of the economic advantage of not using nitrogenous solutions of too high concentration, that is to say, solutions containing a significant excess of nitrogen.

We claim:

1. The process for producing a fertilizer in the form of an hydrated organic agglomerate containing available nitrogen in insoluble organic combination, which comprises contacting activated carbohydrate-containing material under aerobic conditions for an extended time, with a solution of a soluble nitrogenous compound other than alkali metal nitrates or nitrites, in the proportion of 7 to 10 parts of nitrogen to 1,000 parts of dry carbohydrate-containing material.

2. The process for producing a fertilizer in the form of an hydrated organic agglomerate containing available nitrogen in insoluble organic combination, which comprises contacting activated carbohydrate-containing material under aerobic conditions for an extended time, with a solution of ammoniacal nitrogen in the proportion of 7 to 10 parts of nitrogen to 1,000 parts of dry carbohydrate-containing material.

3. The process for producing a fertilizer in the form of an hydrated organic agglomerate containing available nitrogen in insoluble organic combination, which comprises contacting activated carbohydrate-containing material under aerobic conditions for an extended time, with a solution of ammoniacal nitrogen in the proportion of 7 to 10 parts of nitrogen to 1,000 parts of dry carbohydrate-containing material and maintaining a substantially neutral to slightly alkaline reaction with an antacid.

4. The process for producing a fertilizer in the form of an hydrated organic agglomerate containing available nitrogen in insoluble organic combination, which comprises contacting activated straw under aerobic conditions for an extended time, with a solution of a soluble nitrogenous compound other than alkali metal nitrates or nitrites, in the proportion of 7 to 10 parts of nitrogen to 1,000 parts of dry straw.

5. The process for producing a fertilizer in the form of an hydrated organic agglomerate containing available nitrogen in insoluble organic combination, which comprises contacting activated straw under aerobic conditions for an extended time, with a solution of ammoniacal nitrogen in the proportion of 7 to 10 parts of nitrogen to 1,000 parts of dry straw.

6. The process for producing a fertilizer in the form of an hydrated organic agglomerate containing available nitrogen in insoluble organic combination, which comprises contacting activated straw under aerobic conditions for an extended time, with a solution of ammoniacal nitrogen in the proportion of 7 to 10 parts of nitrogen to 1,000 parts of dry straw and maintaining a substantially neutral to slightly alkaline reaction with an antacid.

ERIC HANNAFORD RICHARDS.
HENRY BROUGHAM HUTCHINSON.